United States Patent [19]
Parr et al.

[11] Patent Number: 5,872,816
[45] Date of Patent: Feb. 16, 1999

[54] COHERENT BLIND DEMODULATION

[75] Inventors: Michael Parr; Paul Wei; T. G. Vishwanath, all of San Diego, Calif.

[73] Assignee: Hughes Electronics Corporation, El Segundo, Calif.

[21] Appl. No.: 699,834

[22] Filed: Aug. 20, 1996

[51] Int. Cl.[6] .............................. H03D 1/00; H04L 27/06
[52] U.S. Cl. .................. 375/341; 375/341; 375/340; 375/316; 371/44; 371/45; 371/46; 371/38.1; 371/39.1
[58] Field of Search ...................... 375/341, 340, 375/316; 371/43, 44, 45, 46, 38.1, 39.1

[56] References Cited

U.S. PATENT DOCUMENTS

| | | | |
|---|---|---|---|
| 5,263,033 | 11/1993 | Seshadri | 371/43 |
| 5,272,726 | 12/1993 | Furuya et al. | 375/341 |
| 5,432,821 | 7/1995 | Polydoros et al. | 375/340 |
| 5,450,445 | 9/1995 | Ushirokawa | 375/324 |

*Primary Examiner*—Stephen Chin
*Assistant Examiner*—Michael W. Maddox
*Attorney, Agent, or Firm*—John Whelan; Michael Sales

[57] ABSTRACT

A system and method of blind channel estimation to receive a signal burst over a communications channel; divide the signal burst into a prescribed number of groups of symbols; hypothesize all possible transmitted data sequences or each group; generate a corresponding channel estimate for each possible data sequence; determine an error measurement for each corresponding channel estimate; select a number of the corresponding channel estimates for each group from amongst the corresponding channel estimates, the number of the corresponding channel estimates being selected for having smaller error measurements than remaining corresponding channel estimates not selected; identifying a best channel estimate for each group from amongst the number of the corresponding channel estimates having been selected for each group; and reviewing the best channel estimate having been identified for each group and reidentifying best channel estimates for some of the groups so as to increase smoothness of a curve in two-dimensional space made from the reidentified best channel estimates and the best channel estimates for remaining groups for which no reidentification is made.

17 Claims, 6 Drawing Sheets

COHERENT BLIND DEMODULATION

BACKGROUND OF THE INVENTION

The present invention relates to demodulation, and more particularly to demodulation of a burstwise signal transmitted over a channel that introduces unknown amplitude and phase changes in the burstwise signal. Even more particularly, the present invention relates to demodulation of burstwise communications signals, such as digital cellular telephone signals and the like, having been transmitted through air and having had unknown changes in amplitude and phase introduced thereinto.

In order to effectively operate in a coherent mode, i.e., a mode characterized by a fixed phase relationship between points on an electromagnetic wave, a receiver must determine phase (and possibly amplitude) distortions introduced by a channel through which a signal traverses in reaching the receiver. For mobile communications-type-channels such as cellular-type channels, in particular, the channel often fades rapidly such that significant changes can occur in phase and amplitude distortions, even over individual signal bursts. Hence, the receiver must repeatedly determine a time-varying estimate of the channel's phase and amplitude distortion characteristics. Nonetheless, coherent operation is highly desirable because capacity of, for example, cellular systems can be increased by about sixty percent (2dB) given constant voice quality.

Determination of a coherent frame-of-reference is frequently based on a portion of each signal burst made up of "known" data, i.e., made up of a sequence of symbols that are known a priori to the receiver. Such "known" data may be for example a synch pattern transmitted at a prescribed position within each signal burst. However, when no such "known" data, or synch pattern, (or an insufficient amount of "known" data) is present within signal bursts of a particular system, the receiver must make this determination "blindly", i.e., without the benefit of a priori knowledge of any significant portion of the signal burst.

In the event that known symbols are not available, one approach is to hypothesize all possible symbols, and to evaluate how well each such hypothesis matches the samples actually received. For example, when signal bursts of a length of 40 symbols and a duration of 2 milliseconds, with each symbol representing two bits of data, are utilized in a "blind" system, the total number of possible transmitted bit sequences per burst is $4^{40}$, i.e., approximately $1.2 \times 10^{24}$. For each of these possible sequences, the phase and amplitude distortions of the channel could be estimated, and for each possible sequence, hypothesized data (i.e., the possible sequence) can be passed through the estimated channel. Differences between the hypothesized data having been passed through the estimated channel and the burst actually received can be squared and summed so as to yield a statistic, i.e., a measure of the similarity between the burst actually received and the hypothesized data having been passed through the estimated channel. The estimated channel and hypothesized data that together yield the lowest statistic can then be selected, and the selected estimated channel used to determine an estimate of the burst that was actually transmitted.

Unfortunately, this approach to channel estimation is computationally intractable. Thus, what is needed is an approach to blind demodulation of a coherent signal and more particularly to determining phase and amplitude distortions introduced by a channel through which such signal is transmitted that significantly reduces computational demands as compared to determining a channel estimate for every possible bit sequence for every burst and selecting the channel estimate with the smallest error statistic, while at the same time maintaining a high degree of accuracy in channel estimations.

The present invention advantageously addresses the above and other needs.

SUMMARY OF THE INVENTION

The present invention advantageously addresses the needs above as well as other needs by providing an approach to blind demodulation of burstwise communications signals, such as digital cellular telephone signals and the like, having been transmitted through air and having had unknown changes in amplitude and phase introduced thereinto.

In one embodiment, the invention can be characterized as a method of blindly estimating phase distortions introduced by a communications channel to a transmitted signal. The method involves dividing a portion of a received signal into a prescribed number of groups; determining a channel estimate for each of a plurality of possible data sequences that could have been transmitted in each group; generating a hypothesized received data sequence for each channel estimate by processing each of the plurality of possible data sequences through its channel estimate; determining an error statistic for each channel estimate, each error statistic being indicative of an amount by which each hypothesized received data sequence deviates from a corresponding actual received data sequence; selecting a plurality of the channel estimates for each group, the plurality of channel estimates being selected for each group for having smaller error statistics than another plurality of channel estimates not selected for each group; and selecting a best channel estimate for each group from the plurality of channel estimates having been selected for each group by finding a least error path through a trellis comprising the plurality of channel estimates having been selected for each group.

In another embodiment, the invention can be characterized as a method of blind channel estimation by receiving a signal burst over a communications channel; dividing the signal burst into a prescribed number of groups of symbols; hypothesizing all possible transmitted data sequences for each group; generating a corresponding channel estimate for each possible data sequence having been hypothesized for each group; determining an error measurement for each corresponding channel estimate having been generated; selecting a predetermined number of the corresponding channel estimates for each group from amongst the corresponding channel estimates having been generated for each group, the predetermined number of the corresponding channel estimates being selected for having smaller error measurements than remaining corresponding channel estimates not selected from amongst the corresponding channel estimates for each group; identifying a best channel estimate for each group from amongst the predetermined number of the corresponding channel estimates having been selected for each group; and reviewing the best channel estimate having been identified for each group.

The identifying of the best channel estimates involves forming a trellis with a number of epochs equal to the prescribed number, each epoch containing a number of states equal to said predetermined number, the states each being one of the predetermined number of channel estimates having been selected for each group; determining a branch metric for each possible pair of channel estimates from adjacent epochs as a function of a sum of the error measurement for the channel estimates of each possible pair, and as a function of a difference between the channel estimates of each possible pair; and finding a least cost path though the trellis using a Viterbi analysis in response to said branch metrics having been determined The reviewing the best channel estimates having been selected involves defining a curve in two dimensional space, the curve including the best channel estimates having been identified for each group; defining a plurality of segments of the curve, the segments each including a plurality of the best channel estimates having been identified; determining smoothness of each of the plurality of segments of the curve by comparing the curve with a reference; selecting one of the plurality of segments in response to the determining of smoothness; and reidentifying best channel estimates for each group not in the plurality of groups for which the best channel estimates having been selected are included in the one of the plurality of segments having been selected, the reidentifying being so as to increase smoothness of another curve including the best channel estimates having been reidentified and the best channel estimates included in the one of the plurality of segments having been selected.

In a further embodiment, the invention can be characterized as a system for blindly estimating phase distortions introduced by a communications channel to a transmitted signal. The system has an antenna; a demodulator coupled to the antenna; an analog-to-digital converter coupled to the demodulator; and a processor coupled to the analog-to-digital converter.

The processor has means for dividing a portion of a received signal into a prescribed number of groups; means determining a channel estimate for each of a plurality of possible data sequences that could have been transmitted in each group; means for generating a hypothesized received data sequence for each channel estimate by processing each of the plurality of possible data sequences through its channel estimate; means for determining an error statistic for each channel estimate, each error statistic being indicative of an amount by which each hypothesized received data sequence deviates from a corresponding actual received data sequence; means for selecting a plurality of the channel estimates for each group, the plurality of channel estimates selected for each group being selected to have smaller error statistics than another plurality of channel estimates not selected for each group; and means for selecting a best channel estimate for each group from the plurality of channel estimates having been selected for each group by finding a least error path through a trellis comprising the plurality of channel estimates having been selected for each group.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
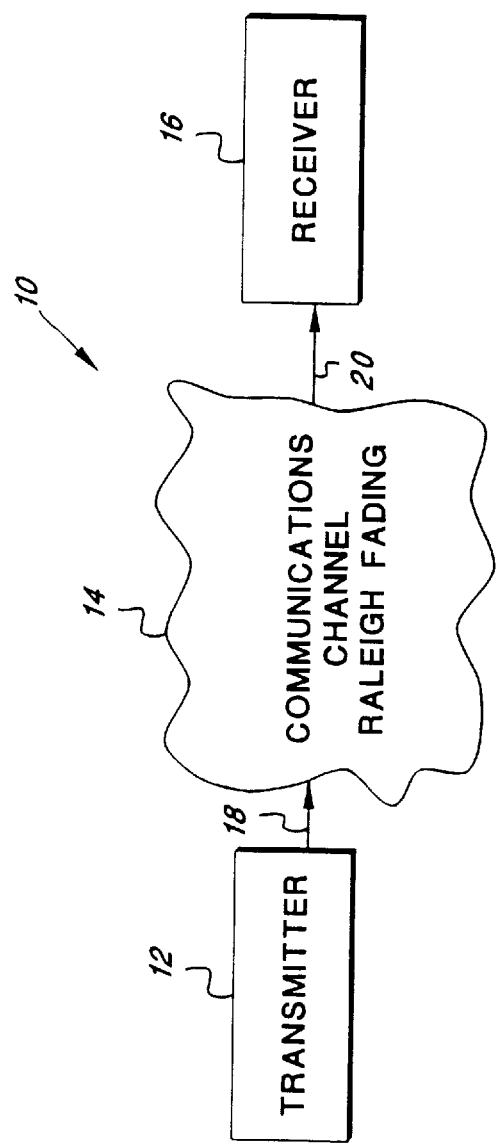
FIG. 1 is a block diagram of a communications system in which an embodiment of the present invention is utilized.

Referring first to FIG. 1, a block diagram is shown of a communications system 10 employing a transmitter 12, a communications channel 14 and a receiver 16. As is frequently the case when the communications channel includes air, the communications channel 14 is responsible for subjecting a transmitted signal 18 from the transmitter 12 to Rayleigh fading. Distortions of the transmitted signal's phase and amplitude occur as a result of Rayleigh fading.

Within the receiver 16 is a demodulator that operates coherently. Problematically, such coherent operation, while desirable, is not possible unless the phase (and possibly amplitude) distortions of the communications channel 14 traversed by a received signal 20 can be accurately tracked.

Heretofore, known information, such as a synch pattern, within each of a plurality bursts in the received signal has been used to approximate the phase and amplitude distortions introduced by the communications channel 14, thereby enabling the demodulator to approximate the phase and amplitude distortions in unknown portions of a signal burst with reasonable accuracy.

When, however, the received signal contains no known portions, or relatively small known portions, i.e., less than 10% of each signal burst, such an approach becomes impossible or impractical.

In sum, when Rayleigh fading occurs, estimating the channel is challenging, and typically leads to performance degradation, however, channel estimation is much easier when an appreciable portion of the transmitted information is known to the receiver. This known portion gives the receiver a basis for forming an initial estimate of the channel's characteristics. Without such a priori knowledge of at least a portion of the transmitted information, however, the receiver must base all of its estimates on noisy, phase and amplitude distorted, unknown samples.

Figure 2:
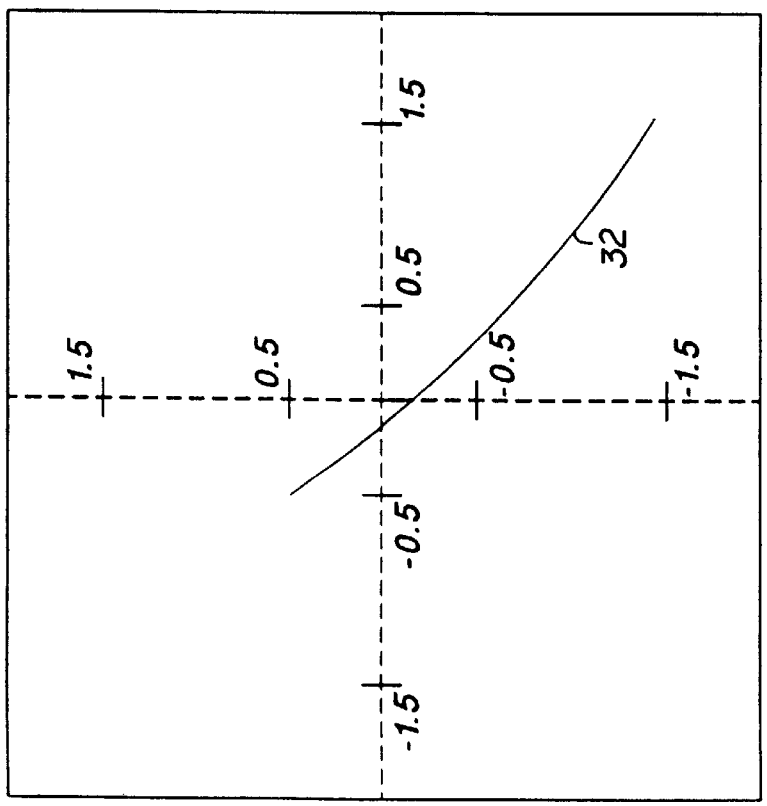
FIG. 2 is a representation of changes in phase and amplitude distortions introduced by a communications channel, such as shown in FIG. 1.

Referring next to FIG. 2, a representation is shown of changes in phase and amplitude distortions introduced by a particular communications channel over time. The representation is shown as a curve 32 in two-dimensional complex space. The representation is over 40 symbols within a particular signal burst. Problematically, these particular variations in phase and amplitude distortion over such signal burst are not, in practice, known a priori. Thus, it is necessary for coherent operation to estimate these variations based on the received signal only.

Figure 3:
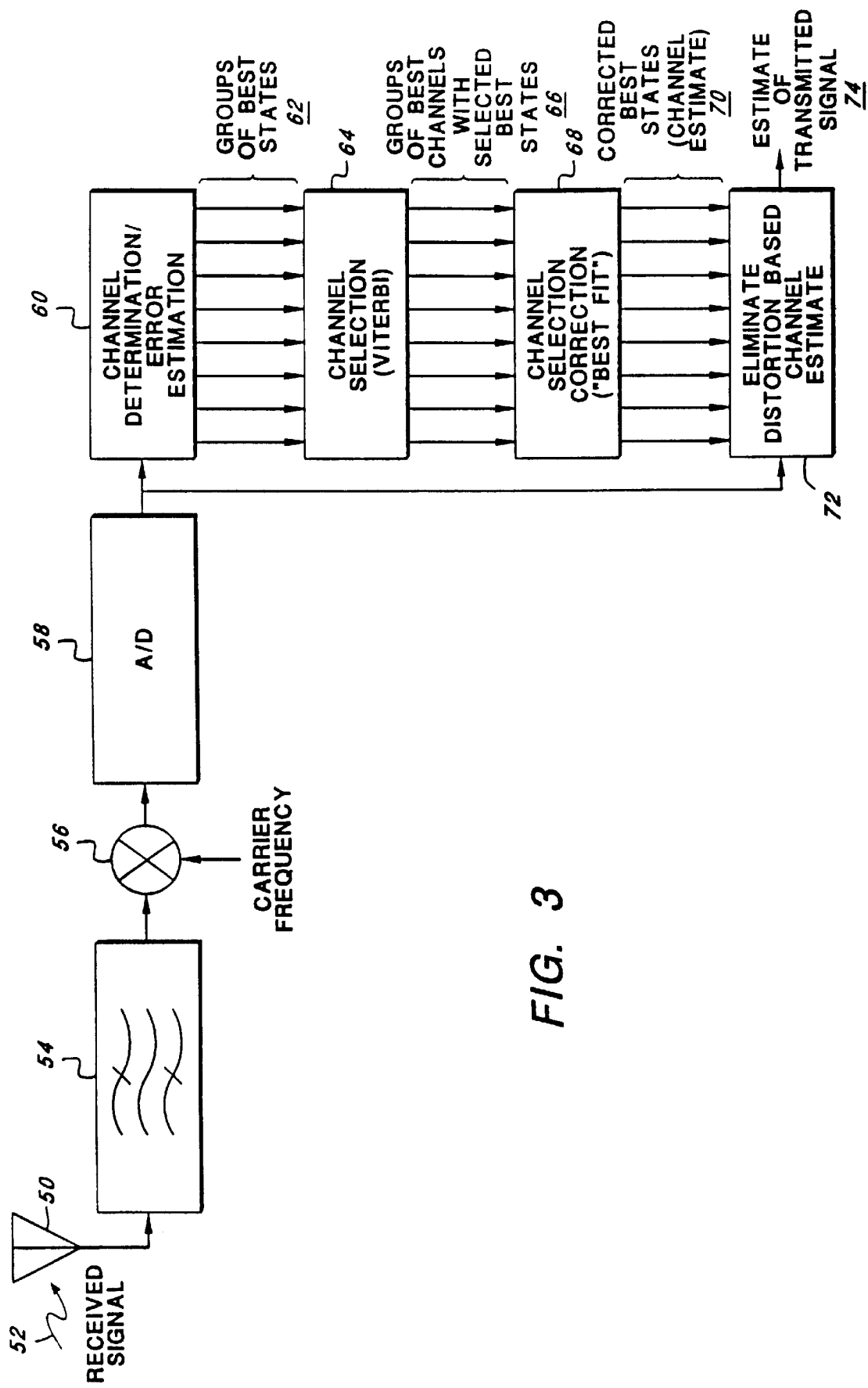
FIG. 3 is a block diagram system for channel estimate in accordance with the present embodiment.

Referring next to FIG. 3, a block diagram is shown of a system for channel estimation based solely on received symbols having already been distorted in phase and amplitude by the channel through which such symbols are transmitted.

As mentioned above, when none of, or only a small number of, the symbols having been transmitted are known to the receiver, it becomes necessary to generate channel estimates based solely or primarily on received symbols that have already been distorted in phase and amplitude by the channel.

The present approach utilizes an antenna 50 to receive a signal 52 (hereinafter the received signal 52) that is made up of a plurality of signal bursts. The received signal 52 is passed through a bandpass filter 54, such as is known in the art, and a demodulator 56, such as is also known in the art.

Figure 4:
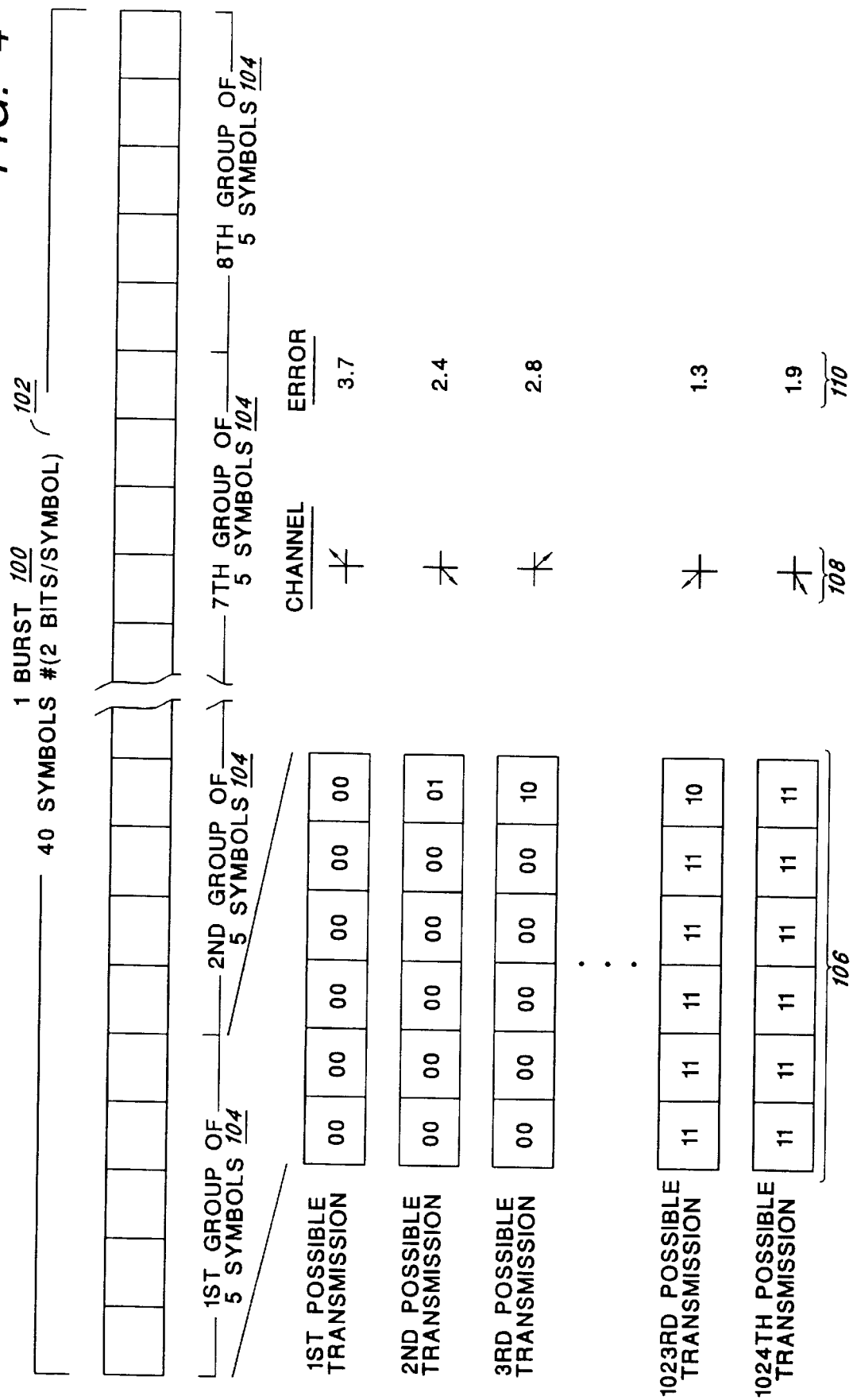
FIG. 4 is a representation of a signal burst that has been divided into groups for which individual channel estimates and corresponding error statistics are generated for each possible data sequence that could have been received in each group by the system of FIG. 3.

Next, the received signal 52 is digitized by an analog-to-digital converter 58 and then segmented into groups of contiguous samples within each burst. For example, as shown in FIG. 4, each burst 100 (FIG. 4), which may be made up of 40 symbols 102 and may be divided into groups 104 (FIG. 4) of five symbols per group, thus yielding eight groups per burst. These groups 104 (FIG. 4) of symbols are passed by the analog-to-digital connector 58 (FIG. 3) to a channel determination error estimation module 60 (FIG. 3).

For each of the possible data sequences transmitted during each of the eight groups 104 (FIG. 4), corresponding phase and amplitude distortions of the channel are estimated by the channel determination/error estimation module 60 (FIG. 3). Note that for each group 104 (FIG. 4), there are $4^5$, i.e., 1024 possible transmitted bit sequences 106 (FIG. 4). Thus, 8 groups 104 (FIG. 4)×1024 possible transmitted bit sequences 106 (FIG. 4) per group, i.e., 8192 possible transmitted bit sequences and 8192 corresponding estimates 108 (FIG. 4) of the phase and amplitude distortions introduced by the channel are generated, which is far fewer than the $1.2 \times 10^{24}$ estimates of the phase and amplitude distortions of the channel that could be estimated, if all possible transmitted bit sequences throughout each signal burst were used in generating estimates of phase and amplitude distortions of the channel.

Next, the channel determination/error module 60 (FIG. 3) determines for each of the eight groups 104 (FIG. 4), the "best" thirty-two estimates 62 of the phase and amplitude distortions of the channel from amongst the 1024 estimates for each of the eight groups. The selection of the thirty-two best estimates 62 (FIG. 3) is based on a statistic 110 (FIG. 4) generated by determining differences between the hypothesized data having been passed through the estimated channel, and the symbols actually received. Each of the thirty-two best estimates in each of the eight groups, has an associated error statistic 110 (FIG. 4), and a location in two-dimensional space.

Note that the 1024 cases (estimates) to be considered for each group can be reduced to 256 if the phase of one of the five symbols (in each estimate) is fixed. (This is because for any given set of unknown received samples, there are four sets of data (i.e., cases) that equally well correspond to such samples. This is because 90° rotations of the whole sequence are equally valid when the samples are unknown, thus creating a four-way ambiguity.) The four way ambiguity in the one of the five symbols for which phase is fixed can be resolved in a trellis structure (see below) by allowing each of four 90° rotations when assigning distance metrics between states (and selecting a least distance metric).

Next, one "best" estimate for each group (to be selected from amongst the thirty-two "best" estimates for each group) is identified by a channel selection module 64 (FIG. 3). Such identification is based on an assumption that the one "best" estimate for each group should be similar to, i.e., not very different from the one "best" estimates selected for each adjacent group. This is because the channel is assumed not to have changed very much over each group of symbols.

Figure 5:
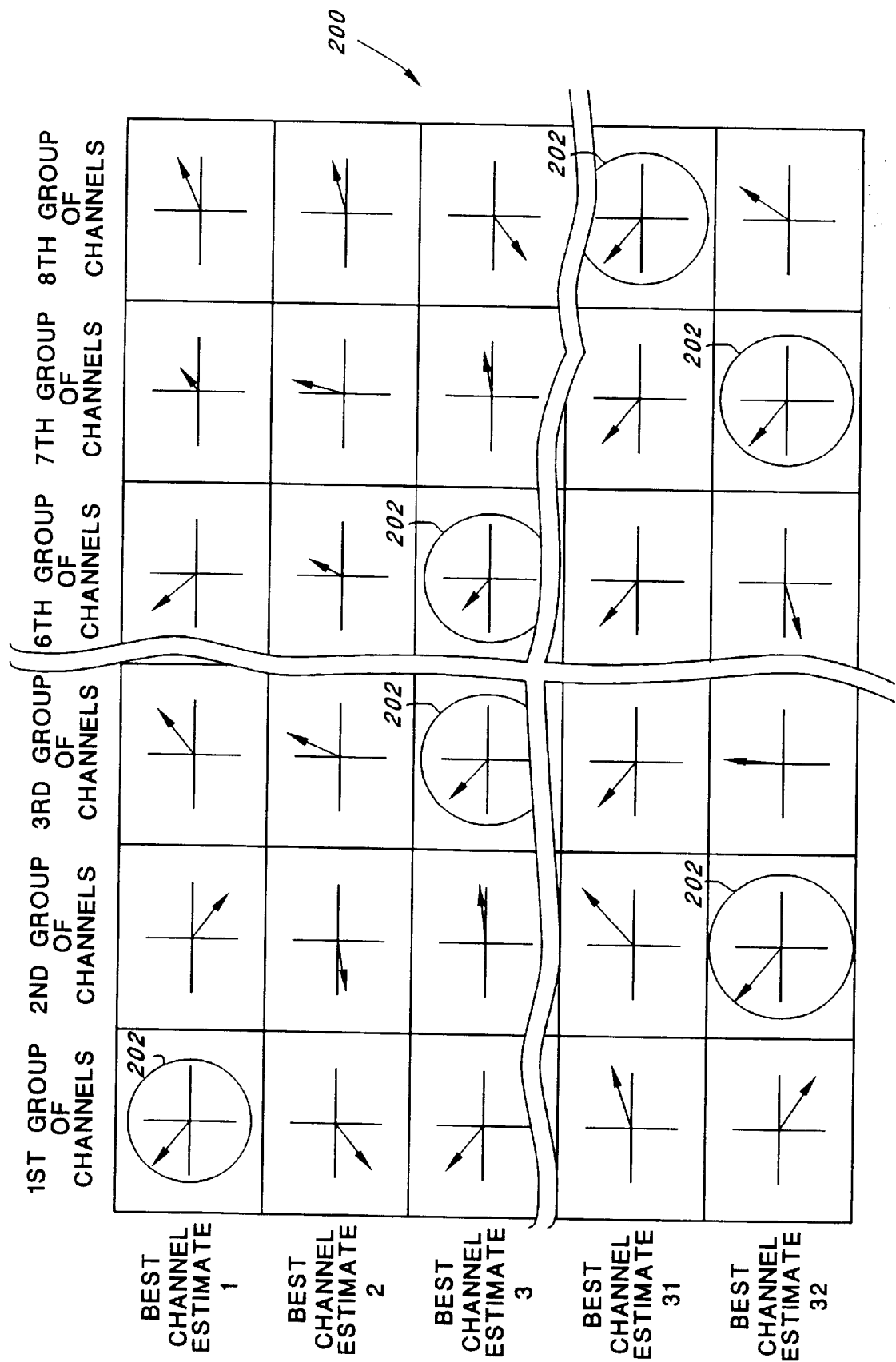
FIG. 5 is a representation of a trellis having eight epochs, each having thirty-two possible states, through which a least cost path is determined by the system of FIG. 3.

Referring to FIG. 5, to select the one best estimate 202 (FIG. 5) for each group, a trellis 200 (FIG. 5) is created by the channel selection module 64 (FIG. 3) with eight epochs, all containing thirty-two states. The "least cost" path though the trellis 200 (FIG. 5) is determined by employing branch metrics. Specifically, a combined error, or branch metric, is determined for each possible pair of the best thirty-two states from adjacent groups of states as a weighted sum of the error originally associated with each of the thirty-two best states, i.e., the error originally used by the channel determination/error estimation module 60 (FIG. 3) to select the thirty-two best states, and of the square of the difference between the each of the thirty-two best states in one of the groups, and each of the thirty-two best states in an adjacent group. In other words, the branch metric is a function of the statistic associated with the one state in one group, the statistic associated with one state in an adjacent group, and a statistic proportional to the distance between the location of such states in two-dimensional space.

Figure 6:
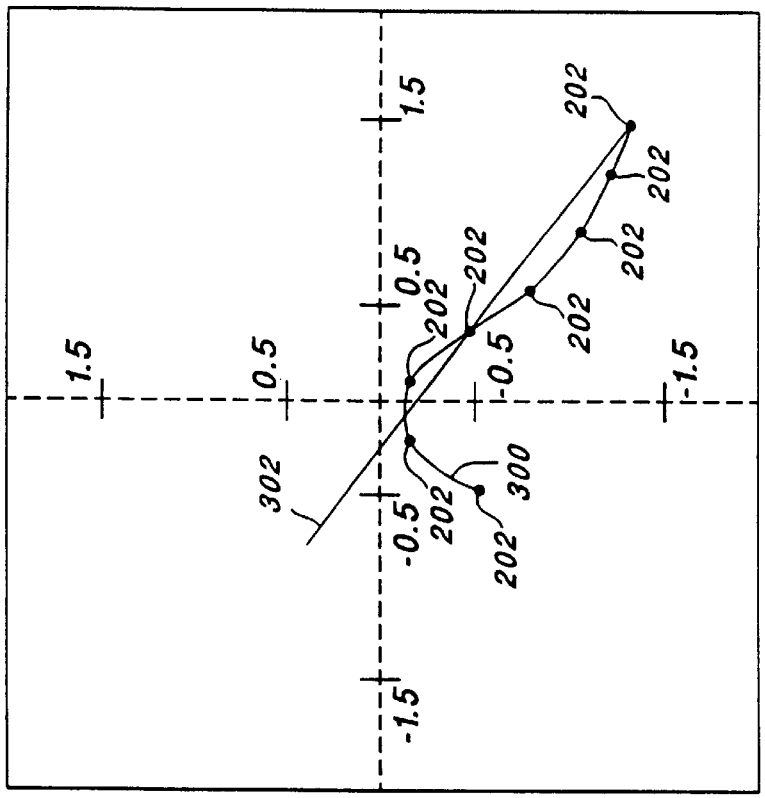
FIG. 6 is a representation of a curve including eight best channel estimates, one from each group, and of a line (or reference) to which a segment of the curve is compared by the system of FIG. 3 in order to determine smoothness of the segment.

After forming this trellis, and after tracing it back, the one best estimate 202 (FIG. 5) for each of the eight groups is selected by the channel selection module 64 (FIG. 3) based on a Viterbi analysis, as described below. As shown in FIG. 6, these eight best estimates 202 (FIGS 5 and 6) (one for each group) define a curve 300 (FIG. 6) in two dimensional space that provides an estimate as to how the channel varied over the burst.

As mentioned above, the determination as to the one best state for each group (which, if made blindly, would include $32^8$ possibilities, i.e., $1.10 \times 10^{12}$) can be based on a Viterbi analysis of all of the possible sequences of states. The Viterbi analysis allows the sequence of states resulting in the least total combined error to be determined in many fewer calculations than if a blind determination were made (i.e., $7 \times (32^2)$, i.e., 7168 calculations).

Viterbi analysis, which is well known in the art, involves determining the error statistic for each state in the first group, i.e., the error originally used to select the thirty-two best states. Next, such analysis involves, for each of the thirty-two best states in each subsequent group, considering each predecessor state, i.e., each of the thirty-two states in the immediately previous group, and determining, for each possible pair of one predecessor state and one subsequent state, a total error made up of (i) the sum of the error associated with the predecessor state, and the error associated with the subsequent state; plus (ii) the error associated with the transition leading from the predecessor state to the subsequent state. The pair of states corresponding to the smallest total error is selected, and the total error and predecessor state associated with the smallest total error are stored for later recall.

In the final group, the state, among the thirty-two possible best states, that has the smallest total error is selected. This final state with the smallest total error, is the "end" of the best path through the eight groups.

Next, the Viterbi analysis involves tracing back through the remembered predecessor states to find the complete "best path" 66 (FIG. 3), i.e., the sequence of states with the least combined total error. Such "tracing back" is known in the art.

While, the Viterbi analysis finds the "path" 66 (FIG. 3) in two-dimensional space that minimizes combined total error of the states relative to one another, it does nothing to evaluate the "smoothness" of the channel estimate curve 300 (FIG. 6) through two-dimensional space. However, because the ability of a real-world communications channel to change quickly is, as a practical matter, limited, the result of the Viterbi analysis is next reviewed by a channel selection connection module 68 (FIG. 3) to assure that the selected "best" path 66 (FIG. 3) represents a relatively "smooth" path through two-dimensional space.

Hence, secondary processing is performed by the channel selection connection module 68 (FIG. 3) in order to select a portion of the path 66 (FIG. 3) resulting from the Viterbi analysis that corresponds, i.e., best fits, to a reasonably smooth line or path 302 (FIG. 6) through two-dimensional space, as would be expected in a real-world channel. For example, the "line" searched for may be a "best fit" straight line, or, in accordance with other embodiments, higher order polynomials.

This "best fit"-type of analysis involves considering hypothesized contiguous segments of the selected best path 66 (FIG. 3) made up of the selected best states from several adjacent groups of states. These segments are selected, for example, to have lengths of from, for example, four to eight, or six to eight states, i.e., from four or six to eight of the "best" states making up the selected best path 66 (FIG. 3). For each hypothesized contiguous segment, an error statistic, such as a sum-squared-error, is calculated indicative of the deviation of the hypothesized contiguous segment from a "best fit" straight line 302 (FIG. 6) through the states making up such segment. A bias factor is applied to favor longer segments (so as to favor using more available information). The segment with the smallest error statistic (after bias is applied) is selected as the basis for an extrapolation to create a final channel estimate 70 (FIG. 3), i.e., path through two-dimensional space.

The bias factor applied to favor longer segments may for example involve dividing the error statistic by the length of the segment in question in states, e.g., 4 states, 5 states, 6 states, 7 states or 8 states, raised to some power, e.g., 1.5.

If the one "best" states (if any) from groups not in the selected segment represent a substantial deviation from the "best fit" line 302 (FIG. 6), another "best" state is selected for such group by the channel selection connection module 68 (FIG. 3) from amongst the thirty-two best states in such group, regardless of the fact that the other "best" state may result in a larger total combined error from a Viterbi analysis point of view. After the other "best" state or states are selected, the final channel estimate 70 (FIG. 3), i.e., path through two-dimensional space, is complete.

Advantageously, the final channel estimate 70 (FIG. 3) represents very accurately the actual channel through which the received signal has passed. Thus, the final channel estimate can be applied by a distortion elimination module 72 (FIG. 3) to the burst actually received in order to determine an estimate of the burst actually transmitted 74 (FIG. 3), which is of course what is ultimately needed. Once the estimate of the burst actually transmitted 74 (FIG. 3) is determined, it can be processed in a conventional manner consistent with the communications system with which the present embodiment is employed.

For example, if the system with which the present embodiment is employed is a cellular telephone system, a mobile radio system, or the like, the estimate of the burst actually transmitted 74 (FIG. 3) could have any of four phases. If some small number of symbols throughout the burst, e.g., three, are known to a receiver, they can be applied in determining the burst's phase, by, for example, determining the squared error of the known symbols under each phase, and selecting the phase that yields the least squared error. Next, if the burst is a voice burst, it can be decoded and used to generate speech from a speaker, or, if the burst is a control burst, it can be used to generate control signals within a remote cellular telephone, such as is well known in the art.

Figure 7:
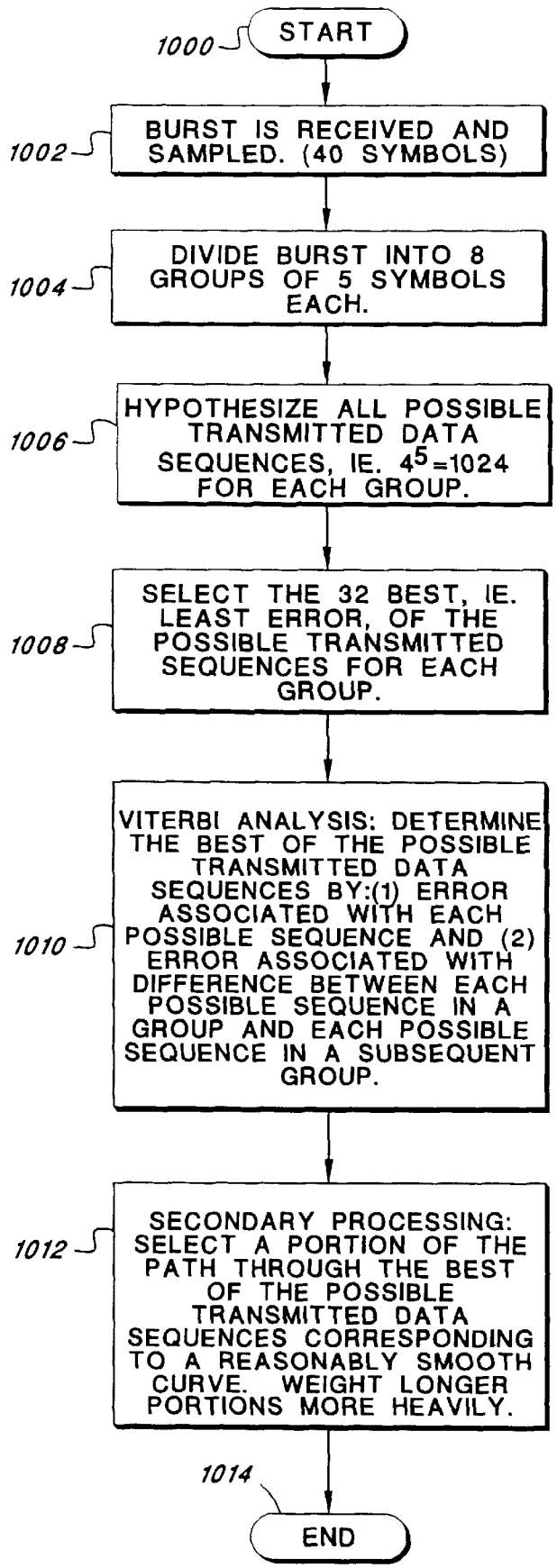
FIG. 7 is a flow diagram of steps traversed by the system of FIG. 3 in order to determine a channel estimate in accordance with the present embodiment.

Referring to FIG. 7, a flow diagram is shown of steps traversed by the system for channel estimation in response to a control program in order to determine a channel estimate in accordance with the present embodiment.

After the control program is initiated (Block 1000), the received signal 52 (FIG. 3) is received (Block 1002), and then is segmented (Block 1004) into groups of contiguous samples within each burst. For example, as shown in FIG. 4, each burst 100 (FIG. 4), which may be made up of -40 symbols 102 and may be divided into groups 104 (FIG. 4) of five symbols per group, thus yielding eight groups per burst.

For each of the possible data sequences transmitted during each of the eight groups 104 (FIG. 4), corresponding phase and amplitude distortions of the channel are estimated (Block 1004). Note that for each group 104 (FIG. 4), there are $4^5$, i.e., 1024 possible transmitted data (bit) sequences 106 (FIG. 4). Thus, 8 groups 104 (FIG. 4)×1024 possible transmitted bit sequences 106 (FIG. 4) per group, i.e., 8192 possible transmitted bit sequences and 8192 corresponding estimates 108 (FIG. 4) of the phase and amplitude distortions introduced by the channel are generated (Block 1006).

Next, the "best" thirty-two estimates 62 (FIG. 4) of the phase and amplitude distortions of the channel are selected (Block 1008) from amongst the 1024 estimates for each of the eight groups. The selection of the thirty-two best estimates 62 (FIG. 3) is based on a statistic 110 (FIG. 4) generated by determining differences between the hypothesized data having been passed through the estimated channel, and the bursts actually received. Each of the thirty-two best estimates in each of the eight groups, has an associated error statistic 110 (FIG. 4), and a location in two-dimensional space.

Note that the 1024 cases (channel estimates) to be considered for each group can be reduced to 256 if the phase of one of the 5 symbols (in each estimate) is fixed. (See explanation above in reference to FIG. 2). The 4 way ambiguity in the one of the 5 symbols for which phase is fixed can be resolved in a trellis structure.

Next, one "best" estimate for each group (to be selected from amongst the thirty-two "best" estimates for each group) is identified (Block 1010). As mentioned above, such identification is based on an assumption that the one "best" estimate for each group should be similar to, i.e., not very different from the one "best" estimates selected for each adjacent group. To select the one best estimate 202 (FIG. 5) for each group, a trellis 200 (FIG. 5) is created with eight epochs, all containing thirty-two states. The "least cost" path through the trellis 200 (FIG. 5) is determined by employing branch metrics. Specifically, the combined error, or branch metric, is determined for each possible pair of the best thirty-two states from adjacent groups of states as a weighted sum of the error originally associated with each of the thirty-two best states, i.e., the error originally used by the channel determination/ error estimation module 60 (FIG. 3) to select the thirty-two best states, and of the square of the difference between the each of the thirty-two best states in one of the groups, and each of the thirty-two best states in an adjacent group.

After forming this trellis, and after tracing it back, the one best estimate 202 (FIG. 5) for each of the eight groups is selected (Block 1010) based on a Viterbi analysis, such as described above in reference to FIGS 3 and 5.

The eight "best" estimates 202 (FIG. 5) (one for each group) define the curve 300 (FIG. 6) in two dimensional space that provides an estimate as to how the channel varied over the burst. Because the ability of a real-world communications channel to change quickly is, as a practical matter, limited, and the result of the Viterbi analysis not, the result of the Viterbi analysis is next reviewed (Block 1012) to assure that the selected "best" path 66 (FIG. 3) represents a relatively "smooth" path through two-dimensional space.

Hence, secondary processing is performed (Block 1012) in order to select a portion of the path 66 (FIG. 3) resulting from the Viterbi analysis that corresponds to a reasonably smooth line or path 302 (FIG. 6) through two-dimensional space, as would be expected in a real-world channel. As mentioned above, the "line" searched for may be a straight line, or, in accordance with other embodiments, higher order polynomials.

This "best fit" -type of analysis involves considering hypothesized contiguous segments of the selected best path 66 (FIG. 3) made up of the selected best states from several adjacent groups of states. These segments are selected, for example, to have lengths of, for example, from four to eight, or from six to eight states, i.e., from four or six to eight of the "best" states making up the selected best path 66 (FIG. 3). For each hypothesized contiguous segment, an error statistic, such as a sum-squared-error, is calculated indicative of the deviation of the hypothesized contiguous segment from the "best fit" straight line 302 (FIG. 6) through the states making up such segment. A bias factor is applied to favor longer segments (so as to favor using more available information), and the segment with the smallest error statistic (after bias is applied) is selected as the basis for an extrapolation to create a final channel estimate 70 (FIG. 3), i.e., path through two-dimensional space.

If the one "best" states from groups (if any) not in the selected segment represent a substantial deviation from the "best fit" line 302 (FIG. 6), another "best" state is selected for such group from amongst the thirty-two best states in such group, regardless of the fact that such other "best" state may result in a larger total combined error from a Viterbi analysis point of view. After the other "best" state or states are selected, the final channel estimate 70 (FIG. 3), i.e., path through two-dimensional space, is complete (Block 1014).

While the invention herein disclosed has been described by means of specific embodiments and applications thereof, numerous modifications and variations could be made thereto by those skilled in the art without departing from the scope of the invention set forth in the claims.

What is claimed is:

1. A method of blindly estimating phase distortions introduced by a communications channel to a transmitted signal comprising:

dividing a portion of a received signal into a prescribed number of groups;

determining a channel estimate for each of a plurality of possible data sequences that could have been transmitted in each group;

generating a hypothesized received data sequence for each channel estimate by processing each of the plurality of possible data sequences through its channel estimate;

determining an error statistic for each channel estimate, each error statistic being indicative of an amount by which each hypothesized received data sequence deviates from a corresponding actual received data sequence;

selecting a plurality of the channel estimates for each group, the plurality of channel estimates selected for each group having smaller error statistics than another plurality of channel estimates not selected for each group; and selecting a best channel estimate for each group from the plurality of channel estimates having been selected for each group by finding a least error path through a trellis comprising the plurality of channel estimates having been selected for each group.

2. The method of claim 1 wherein said selecting of said plurality of the channel estimates for each group includes selecting a prescribed number of channel estimates for each group.

3. The method of claim 1 further comprising:

defining a curve in two dimensional space, the curve including the best channel estimates having been selected for each group;

defining a plurality of segments of the curve, the segments each including a plurality of the best channel estimates having been selected for a plurality of said groups;

determining smoothness of the plurality of segments of the curve by comparing the curve with a reference;

selecting one of the plurality of segments in response to the determining of smoothness; and reselecting best channel estimates for each group not in the plurality of groups for which the best channel estimates having been selected are included in the one of the plurality of segments having been selected, the reselecting being so as to increase smoothness of another curve including the best channel estimates having been reselected and the best channel estimates included in the one of the plurality of segments having been selected.

4. The method of claim 3 wherein said selecting one of the plurality of segments includes weighting longer segments in said plurality of segments more heavily than shorter segments.

5. The method of claim 4 wherein said dividing of said portion of said received signal includes dividing a signal burst into said plurality of groups.

6. The method of claim 5 wherein said determining of said channel estimate for each of said plurality of possible data sequences, includes determining said channel estimate for each possible data sequence that could have been transmitted in each group.

7. The method of claim 1 wherein said selecting of said best channel estimate for each group by finding said least error path through said trellis comprises performing a Viterbi analysis.

8. A method of blind channel estimation comprising:

receiving a signal burst over a communications channel;

dividing the signal burst into a prescribed number of groups of symbols;

hypothesizing all possible transmitted data sequences or each group;

generating a corresponding channel estimate for each possible data sequence having been hypothesized for each group;

determining an error measurement for each corresponding channel estimate having been generated;

selecting a predetermined number of the corresponding channel estimates for each group from amongst the corresponding channel estimates having been generated for each group, the predetermined number of the corresponding channel estimates being selected for having smaller error measurements than remaining corresponding channel estimates not selected from amongst the corresponding channel estimates for each group;

identifying a best channel estimate for each group from amongst the predetermined number of the corresponding channel estimates having been selected for each group, including:

forming a trellis with a number of epochs equal to the prescribed number, each epoch containing a number of states equal to said predetermined number, the states each being one of the predetermined number of channel estimates having been selected for each group;

determining a branch metric for each possible pair of channel estimates from adjacent epochs as a function of a sum of the error measurement for the channel estimates of each possible pair, and as a function of a difference between the channel estimates of each possible pair; and finding a least cost path though the trellis using a Viterbi analysis in response to said branch metrics having been determined; and reviewing the best channel estimate having been identified for each group, including:

defining a curve in two dimensional space, the curve including the best channel estimates having been identified for each group;

defining a plurality of segments of the curve, the segments each including a plurality of the best channel estimates having been identified;

determining smoothness of each of the plurality of segments of the curve by comparing the curve with a reference;

selecting one of the plurality of segments in response to the determining of smoothness; and reidentifying best channel estimates for each group not in the plurality of groups for which the best channel estimates having been selected are included in the one of the plurality of segments having been selected, the reidentifying being so as to increase smoothness of another curve including the best channel estimates having been reidentified and the best channel estimates included in the one of the plurality of segments having been selected.

9. The method of claim 8 wherein said selecting of one of said plurality of segments includes weighting longer segments in said plurality of segments more heavily than shorter segments.

10. An system for blindly estimating phase distortions introduced by a communications channel to a transmitted signal comprising:

an antenna;

a demodulator coupled to the antenna;

an analog-to-digital converter coupled to the demodulator;

a processor coupled to the analog-to-digital converter comprising:

means for dividing a portion of a received signal into a prescribed number of groups;

means determining a channel estimate for each of a plurality of possible data sequences that could have been transmitted in each group;

means for generating a hypothesized received data sequence for each channel estimate by processing each of the plurality of possible data sequences through its channel estimate;

means for determining an error statistic for each channel estimate, each error statistic being indicative of an amount by which each hypothesized received data sequence deviates from a corresponding actual received data sequence;

means for selecting a plurality of the channel estimates for each group, the plurality of channel estimates selected for each group having smaller error statistics than another plurality of channel estimates not selected for each group; and means for selecting a best channel estimate for each group from the plurality of channel estimates having been selected for each group by finding a least error path through a trellis comprising the plurality of channel estimates having been selected for each group.

11. The method of claim 10 wherein said means for selecting of said plurality of the channel estimates for each group includes means for selecting a prescribed number of channel estimates for each group.

12. The method of claim 11 further comprising:

means for defining a curve in two dimensional space, the curve including the best channel estimates having been selected for each group;

means for defining a plurality of segments of the curve, the segments each including a plurality of the best channel estimates having been selected for a plurality of said groups;

means for determining smoothness of the plurality of segments of the curve by comparing the curve with a reference;

means for selecting one of the plurality of segments in response to the means for determining of smoothness; and means for reselecting best channel estimates for each group not in the plurality of groups for which the best channel estimates having been selected are included in the one of the plurality of segments having been selected, the reselecting being so as to increase smoothness of another curve including the best channel estimates having been reselected and the best channel estimates included in the one of the plurality of segments having been selected.

13. The method of claim 12 wherein said means for selecting one of the plurality of segments includes means for weighting longer segments in said plurality of segments more heavily than shorter segments.

14. The method of claim 13 wherein said means for dividing said portion of said received signal includes means for dividing a signal burst into said plurality of groups.

15. The method of claim 14 wherein said means for determining of said channel estimate for each of said plurality of possible data sequences includes means for determining said channel estimate for each possible data sequence that could have been transmitted in each group.

16. The method of claim 15 wherein said means for determining said channel estimate includes means for determining said channel estimate for each possible data sequence that could have been transmitted in each group.

17. The method of claim 10 wherein said means for selecting said best channel estimate for each group by finding said least error path through said trellis comprises means for performing a Viterbi analysis.

* * * * *